May 30, 1933. R. J. A. INGOUF 1,911,573
PROCESS AND APPARATUS FOR MAKING COMPOSITE GLASS SHEETS
Filed Sept. 20, 1930
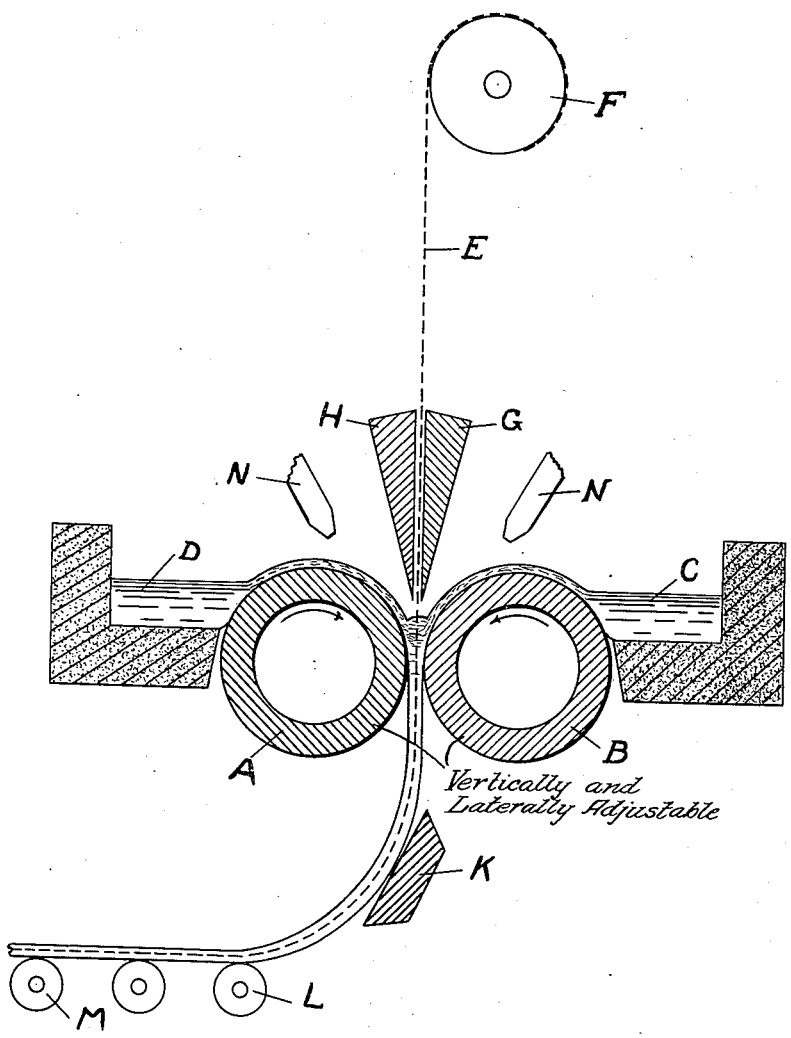
Inventor
ROBERT J. A. INGOUF
By [signature]
Attorney Patented May 30, 1933

1,911,573

UNITED STATES PATENT OFFICE

ROBERT J. A. INGOUF, OF KINGSPORT, TENNESSEE, ASSIGNOR TO BLUE RIDGE GLASS CORPORATION, OF KINGSPORT, TENNESSEE

PROCESS AND APPARATUS FOR MAKING COMPOSITE GLASS SHEETS

Application filed September 20, 1930. Serial No. 483,347.

In the making of polished wire glass, various processes have been heretofore employed, but experience seems to show that in order to obtain a glass which is entirely free from bubbles and discoloration, it is generally desirable to produce two separate sheets of glass between which a wire mesh is inserted while the two sheets are still in a plastic condition, and compression is then applied to bring the sheets together in order to weld them.

The above method has heretofore been applied with success to the production of wire glass in which separate sheets of glass are cast by means of ladles or pots, the speed of sheet formation being about 15 feet per minute. This comparatively high rate of speed is required, because it is necessary to keep the glass plastic enough and consequently hot enough to obtain a good welding of the two sheets. This high speed of formation necessitates the use of lehrs of an extremely great length and requires a daily tonnage of glass well in excess of anything that can be supplied by a tank of acceptable dimensions. Consequently, in practice the process is inapplicable.

To avoid these defects I propose to produce the two sheets at a much lower speed of formation and to seal the wire mesh between them while their adjacent surfaces are still hot enough to seal.

My invention comprises simultaneously producing two separate sheets of glass, each being brought substantially to the same condition of temperature distribution (in order to avoid subsequent strains in the finished product) but one surface of each sheet being very materially colder than the other surface. The object which I have had in mind has been in fact, to create two separate sheets, one surface of each which is cold enough to give to such sheet a relative solidity and stiffness, while the other surface of such sheet is hot enough to remain quite plastic and is at a temperature sufficiently high so that when a wire mesh is inserted between the two sheets, the inner surfaces of the said two sheets, which come into contact with each other, can be perfectly welded together and with the wire, and it further consists in the construction, arrangement and combination of parts of an apparatus for carrying out such method.

The accompanying drawing is a representation of an apparatus invented by me for carrying out my improved process. In this drawing A and B are rolls, revolving at practically the same speed and in opposite directions, those two rolls being cooled internally by means of air, steam or water. These rolls are arranged adjacent to each other, and adjacent to each is a trough C or D formed for instance, by refractory blocks, supported by metal frames, to contain the glass which is used for forming the two separate sheets. Glass is fed to these troughs either by letting glass run continuously into them from a tank, or by pouring glass into these troughs from time to time by means of ladles or pots.

The upper level of the glass in the troughs is maintained in the vicinity of the upper generatrix of the rolls A and B. That level may be regulated either by changing the level of the glass in troughs C and D or by raising or lowering rolls A and B, or by a combination of both methods. The important point is that the level is such that for a given set of temperatures for both the glass in the troughs and the surface of the rolls, combined with the proper speed of the rolls, the duration of contact between the lower surface of the sheets and of the rolls be sufficient to obtain the three following objects: (1) to create the required stiffness of the lower surface of each separate sheet, (2) to maintain the proper plasticity of the upper surface of each separate sheet, and (3) to obtain the desired thickness of the separate sheets formed.

It should be noted that with this process the upper surface of each sheet remains absolutely untouched by any foreign body until the very instant when the contact between the wire mesh and the two formed sheets takes place. For that reason, the sheets can be perfectly welded together and with the wire mesh; and besides, the glass obtained is particularly free from bubbles, unsealed spots, and other defects which are generally present in glass sheets made by other methods.

It should also be noted that the desired thickness of the two separate sheets is obtained without using a sizing pass (slot in a fixed plate, or interval between rolls), and that thickness is obtained by the proper regulation of the relative elements of temperature of the glass, temperature of the roll surface, level of the glass and speed of the rolls. Once the two compound sheets are formed, the pass between rolls is used, bringing into mutual contact the two sheets and the inserted wire mesh, but the object of the pass is not, to any material degree, to determine the thickness of finished composite product.

A device for feeding wire mesh E is located above the rolls and may consist, for instance, of a drum F supporting a roll of wire (with accessory devices for keeping the wire taut and to guide it downward between the rolls A and B), and sets of shields G and H, water-cooled or otherwise, for protecting the wire as far as possible, against radiation from the hot glass. A support such as K placed underneath the rolls, and rollers such as L and M, guide the formed sheet towards the lehr in which it will be annealed. The distance between centers of the rolls A and B is susceptible of adjustment, so that the size of the pass between the rolls may be regulated at will by the operator.

The machine having thus been described, its operation will be as follows:

The machine having been connected with the sources from which glass is supplied, rolls A and B are set in motion. The glass in troughs C and D is brought to the proper level, and the temperature of the cooling fluid in rolls A and B is regulated so that in the layers of glass which flow slowly from troughs C and D onto the upper part of rolls A and B, cooled lower surfaces are formed in contact with the rolls, while the upper surfaces remain plastic and two separate sheets are formed, which move toward each other. The wire mesh is inserted shortly before the two sheets reach the pass, where, due to the pressure exerted by rolls A and B, complete sealing of the two sheets takes place.

With this process, the lineal speed of the sheets formed may vary between about 30 and 70 inches per minute, according to the thickness of the plates to be obtained, the temperature of the molten glass, and the cooling effect of the rolls A and B. A lehr of moderate length is used for annealing the glass.

In the description given hereabove, of the machine and of the process, it has been assumed that one pair of rolls A and B is used both for the purpose of forming the separate sheets and of sealing them together.

Should the molten glass in the troughs be found too cold, lines of heaters N can be located in proximity to the outer surface of the glass on rolls AB, in order to bring the upper surfaces of the two glass sheets to the proper temperature.

It is also possible to engrave either roll A or B, or both, with appropriate designs as that such designs be imprinted on one or on two of the surfaces of the glass product finally obtained.

The processes and the device described apply, not only to glass reinforced with wire, but also to glass reinforced with any other material, transparent or not.

Having thus described my invention, what I claim is:—

1. The hereinbefore described process of making a compound glass sheet which comprises flowing glass in thin layers over and in contact with travelling surfaces, and thereby forming a set lower surface on two plastic sheets of glass while the upper surfaces of such sheets are unformed by contact with forming surfaces, bringing the upper surfaces of the sheets into contact with each other, and uniting the sheets by pressure.

2. The hereinbefore described process of making a compound glass sheet which comprises flowing glass in thin layers over and in contact with travelling surfaces, and thereby forming a set lower surface on two plastic sheets of glass while the upper surfaces of such sheets are unformed by contact with forming surfaces, and feeding the plastic sheets toward each other and bringing their unformed surfaces into contact by the continued movement of such travelling surfaces.

3. The hereinbefore described process of making a compound sheet which comprises feeding glass by gravity in a separate thin layer over the upper surface of each of two rollers, moving the glass in contact with the roll until the lower surface of each layer has become set and two sheets are formed, the thickness of each being determined by the head of glass fed to the roll, the viscosity of the glass and the peripheral speed of the roll, and bringing the upper surfaces of the two sheets in contact with each other by the continued travel of the rolls.

4. In a machine of the kind described the combination with two glass feeding elements delivering glass in a substantially horizontal direction, a roll in front of each feeding element obstructing the flow of glass therefrom but over which the glass flows by gravity, the rolls having a forming pass between them and their upper surfaces moving in a direction from the corresponding feeding element to the pass, and means for shifting the rolls vertically to control the thickness of glass fed thereover.

5. In a machine of the kind described the combination with two glass feeding elements delivering glass in a substantially horizontal direction, a roll in front of each feeding element obstructing the flow of glass therefrom but over which the glass flows by gravity, the rolls having a forming pass between them and their upper surfaces moving in a direction from the corresponding feeding element to the pass, means for shifting the rolls vertically to control the thickness of glass fed thereover, and means for controlling the temperature of the surfaces of the feed roll.

In testimony whereof I hereunto affix my signature.

ROBERT J. A. INGOUF.